United States Patent
Kyomitsu

(10) Patent No.: US 7,212,966 B2
(45) Date of Patent: May 1, 2007

(54) VOICE RECOGNITION APPARATUS FOR VEHICLE

(75) Inventor: Tatsuya Kyomitsu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 918 days.

(21) Appl. No.: 10/193,521

(22) Filed: Jul. 11, 2002

(65) Prior Publication Data

US 2003/0023432 A1    Jan. 30, 2003

(30) Foreign Application Priority Data

Jul. 13, 2001  (JP)  ............................. 2001-214389
Aug. 21, 2001  (JP)  ............................. 2001-250575

(51) Int. Cl.
  *G10L 15/20*   (2006.01)
  *G10L 11/00*   (2006.01)
  *G08B 21/00*   (2006.01)
  *H04R 29/00*   (2006.01)

(52) U.S. Cl. ..................... 704/233; 704/231; 704/270; 340/540; 381/56

(58) Field of Classification Search ..................... None
See application file for complete search history.

(56) References Cited

U.S. PATENT DOCUMENTS

| 5,717,738 | A | * | 2/1998 | Gammel | .................. 379/88.03 |
| 6,148,105 | A | * | 11/2000 | Wakisaka et al. | ........... 382/190 |
| 6,324,499 | B1 | * | 11/2001 | Lewis et al. | ................. 704/233 |
| 6,686,839 | B2 | * | 2/2004 | Chou et al. | ................. 340/540 |
| 2002/0019734 | A1 | * | 2/2002 | Bartosik | ...................... 704/231 |
| 2002/0107695 | A1 | * | 8/2002 | Roth et al. | ................... 704/275 |
| 2003/0046088 | A1 | * | 3/2003 | Yuschik | ....................... 704/276 |
| 2003/0093281 | A1 | * | 5/2003 | Geilhufe et al. | ............ 704/275 |

* cited by examiner

*Primary Examiner*—David Hudspeth
*Assistant Examiner*—Matthew J Sked
(74) *Attorney, Agent, or Firm*—Rankin, Hill, Porter & Clark LLP

(57) ABSTRACT

A speech recognition apparatus for a vehicle is provided for decreasing the feeling of discomfort of the operator even in the case that speech recognition is continuously impossible over several times. The speech recognition apparatus for a vehicle that recognizes voice input via an voice input device comprises a response output device for outputting a response to said voice input, a recognition possible or impossible determining device for determining whether said voice input can be recognized, and a response change executing device for operating when recognition is impossible for outputting a response having a different expression from said response output device depending on the number of times it has been determined that recognition is impossible by said recognition possible or impossible determining device.

15 Claims, 8 Drawing Sheets

VOICE RECOGNITION APPARATUS FOR VEHICLE

BACKGROUND OF THE INVENTION

1. Field of the Invention

The present invention relates to a voice recognition apparatus for a vehicle mounted in a vehicle, and in particular to a technology in which a response to a voice input is output.

2. Description of the Related Art

In a conventional voice recognition apparatus such as that disclosed in Japanese Unexamined Patent Application, First Publication, No. Hei 11-109989, a voice recognition apparatus is known that outputs a response comprising a different expression depending on the number of recognition errors that have occurred with respect to a voice input from the user.

In addition, in a music playing apparatus such as that disclosed in Japanese Unexamined Patent Application, First Publication, No. Hei 11-265190, a music playing apparatus is known that determines whether or not voice input can be recognized and outputs the results of the determination.

However, in the voice recognition apparatus according to the first example of the conventional technology described above, in the case that the recognition errors with respect to the voice input occur repeatedly, at that time responses having a different expression is output. However, cases in which the execution of the voice recognition processing itself is impossible are not considered. Examples of such cases are the case in which the noise in the vicinity is large or the case in which the sensitivity of the microphone or the like is in a saturated state. There is a concern, for example, that the operator will feel discomfort due to continuing to output a message that prompts a voice input, for example, an identical message informing the operator that voice recognition is impossible.

In addition, in the music playing apparatus according to the second example of the conventional technology described above, the apparatus simply displays a message informing the user that voice recognition is impossible when it determines that voice recognition processing is impossible, and for example, in the case that the determination that voice recognition is impossible occurs repeatedly, the same message is repeatedly displayed, and there is a concern that the operator will be caused to feel discomfort.

In consideration of the above-described problems, it is an object of the present invention to provide a vehicle voice recognition apparatus that can decrease the discomfort felt by the operator even in the case that it is determined voice recognition is impossible many times continuously.

SUMMARY OF THE INVENTION

The present invention is directed specifically toward an improved voice recognition apparatus for a vehicle. All of the following references to voice recognition or speech recognition are considered to be equivalent in all regards. In order to solve the problems described above and attain the object of the invention, a first aspect of the present invention is a vehicle voice recognition apparatus that recognizes voice input via an input device (for example, the microphone 12 in the embodiment described below), comprising a response output device (for example, the speaker 13 in the embodiment described below) that outputs a response to the voice input; a recognition possible/impossible determining device (for example, the voice recognition possible/impossible determining unit 21 in the embodiment described below) that determines whether or not the voice input can be recognized; and a response change executing device (for example, the response change executing unit 22 in the embodiments explained below, which operates when recognition is impossible), which operates when recognition is impossible, that outputs a response having a different expression differing from those of the response device depending on the number of times it has been determined that recognition is impossible by the recognition possible/impossible determining device.

According to the vehicle voice recognition apparatus having a structure, when the recognition possible/impossible determining device detects, for example, the state in which the level of noise in the vicinity is high or the state in which the sensitivity of the voice input device is saturated due to wind blowing on the voice input device comprising, for example, a microphone, it is determined that voice recognition is impossible. In addition, the response change executing device that operates when recognition is impossible outputs a response having a different expression that differs from those of the response device depending on the number of times that the impossibility of recognition has been determined in the recognition possible/impossible determining device.

Thereby, even in the case that for example voice recognition is repeatedly determined to be impossible, at that time responses having different expressions are output, and thus for example, in comparison to repeatedly outputting the same response, the feeling of discomfort of the operator is decreased.

In addition, a second aspect of the present invention is a vehicle voice recognition apparatus that recognizes voice input via an input device (for example, the microphone 12 in the embodiment described below), comprising a response output device (for example, the speaker 13 in the embodiment described below) that outputs a response to the voice input; a recognition possible/impossible determining device (for example, the voice recognition possible/impossible determining unit 21 in the embodiment described below) that determines whether or not the voice input can be recognized; a factor detecting device (for example, step S 02 to step S 11 in the embodiment described below) that detects the factors in the determination of the recognition impossibility based on the state of the voice input device or the state of the vehicle in the case that it is determined that recognition is impossible by the recognition possible/impossible determining device; and a response change executing device (for example, step S 42 to step S 48 in the embodiment described below), which operates when recognition is impossible, that outputs a response having a different expression that differs from those of the response device.

According to the vehicle voice recognition apparatus having such a structure, when the recognition possible/impossible determining device detects, for example, a state in which the level noise in the vicinity is high or the state in which the sensitivity of the voice input device is saturated due to wind blowing on the voice input device comprising, for example, a microphone, it is determined that voice recognition is impossible.

In addition, the factor detection detecting device ascertains the factors determined to make recognition impossible by detecting, for example, the state in which the level of noise in the vicinity is high, the state in which wind is blowing on the voice input device, or a state of the vehicle, for example, a state in which a window is open or a state in which the air conditioning apparatus is in operation.

In addition, the factors that have been determined to make recognition impossible can be ascertained by the apparatus detecting the present position of the vehicle using the navigation apparatus or the like. An example of such a factor is when it is detected that the vehicle is in a location such as a tunnel where the level of noise is extremely high.

In addition, the response change executing device that operates when recognition is impossible outputs the response having a different expression differing from that of the response device depending on the factors that have been detected in the factor detection device.

Thereby, even in the case that, for example, it is repeatedly determined that voice recognition is impossible, at this time, a response having a differing expression is output, and thereby in comparison to repeatedly outputting the same response, the feeling of discomfort of the operator can be reduced.

Furthermore, because the operator is specifically notified about the cause that has been determined to make the recognition impossible, the operator can implement appropriate activity in order to make voice recognition possible depending on the content of the response, and make the apparatus function effectively.

Furthermore, a third aspect of the present invention is a vehicle voice recognition apparatus comprising a voice recognition device (for example, step S 52 in the embodiment explained below) that carries out recognition on the voice input depending on a predetermined recognition threshold value corresponding; and a recognition threshold value update device (for example step S 75 and step S 95 in the embodiment explained below) that updates the recognition threshold value referred to by the voice recognition device to a value at least lower than a predetermined value in the case that it is determined that recognition is impossible in the recognition possible/impossible determining device.

According to the vehicle voice recognition apparatus having the structure described above, the voice recognition device carries out voice recognition by selecting from preset predetermined reference data a candidate for a word or speech pattern having a high likelihood depending, for example, on a predetermined recognition value for the data of the voice input that has been input via the voice input device. Here, in the case that it has been determined that recognition is impossible in the recognition possible/impossible determining device, the recognition threshold value is updated to a value lower than at least a predetermined value by the recognition threshold update device.

Thereby, for example, even in the case that a candidate corresponding, for example, to the data of a voice input is not found and it is determined that recognition is impossible, there is the possibility that a corresponding candidate can be found by updating the recognition threshold value. Thus, the feeling of discomfort of the operator can be further reduced, and the apparatus can be effectively operated.

Furthermore, a fourth aspect of the present invention is a vehicle voice recognition apparatus comprising a recognition result output device (for example step 31 and step 59 in the embodiment described below) that outputs the recognition result of the voice input; a recognition result cancellation device (for example the operation switch 14 in the embodiment described below) that cancels the recognition result; and a response change executing device (for example, the cancellation change executing unit 24 in the embodiment described below), which operates during cancellation, that outputs a response having a different expression is different from that of the response means depending on the number of times the recognition result is cancelled or the factor that caused the cancellation of the recognition result being cancelled in the case that the recognition result in the recognition result cancellation device.

According to the vehicle voice recognition apparatus having the structure described above, the recognition result output device outputs to the operator the recognition result of the voice input by talk-back output or the like. Here, when the operator determines that this recognition result is a recognition error, the recognition result is cancelled by the recognition result cancellation device, and then the apparatus is directed to execute recognition processing again.

At this time, the cancel response change executing device outputs a response having a different expression from the response device depending on the number of times the recognition result has been cancelled or the factor that caused the cancellation of the recognition result.

Thereby, even in the case, for example, that the recognition errors of the voice input are repeated, at this time, responses comprising different expressions are output, and in comparison, for example, to repeatedly outputting the same response, the feeling of discomfort of the operator is decreased.

PREFERRED EMBODIMENT OF THE PRESENT INVENTION

Figure 1:
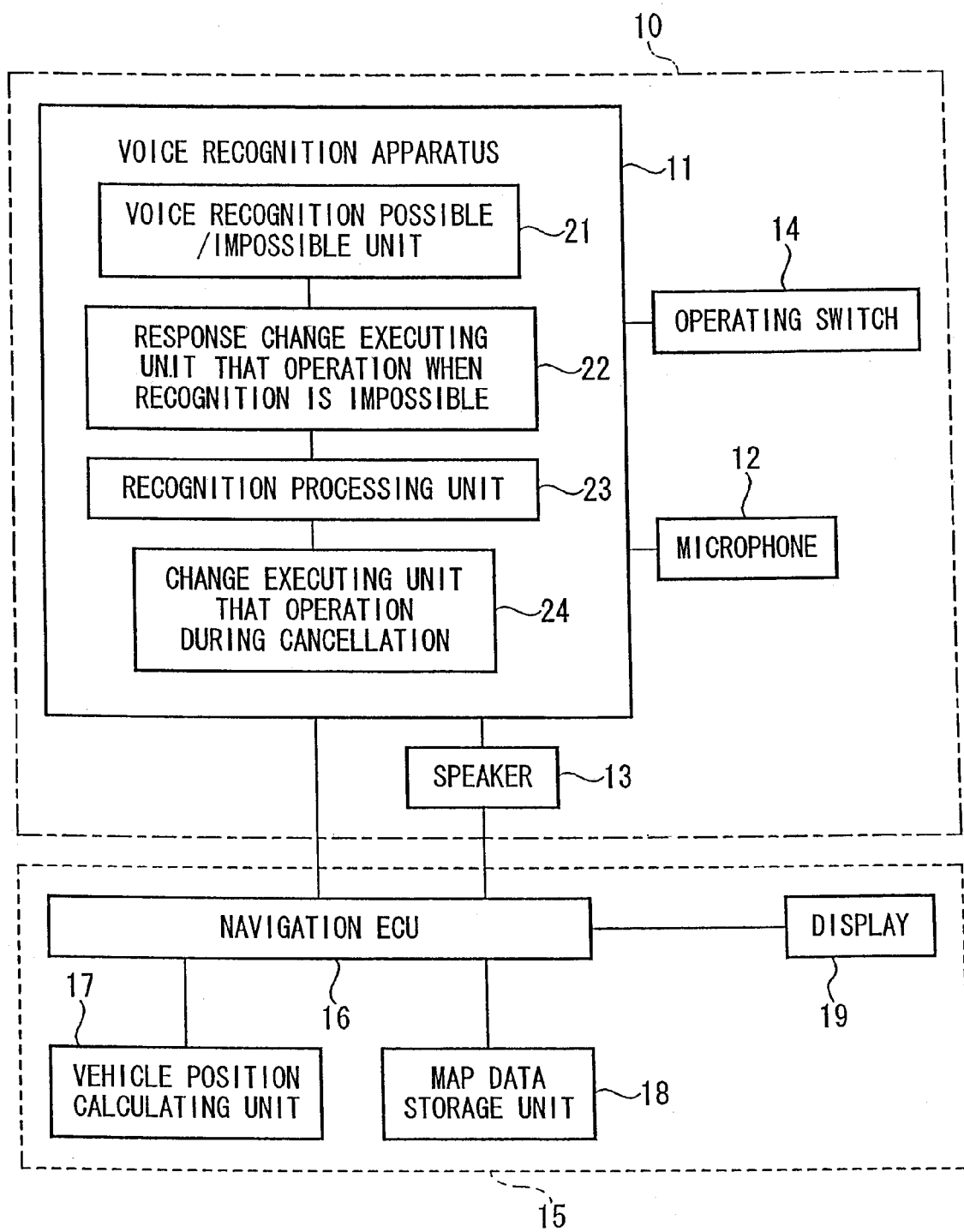
FIG. 1 is a block diagram of the vehicle voice recognition apparatus according to an embodiment of the present invention.

Below, the vehicle voice recognition apparatus according to an embodiment of the present invention will be explained with reference to the figures. FIG. 1 is a block diagram of a vehicle voice recognition apparatus 10 according to an embodiment of the present invention.

The vehicle voice recognition apparatus 10 according to the present embodiment comprises, for example, a voice recognition apparatus 11, a microphone 12, a speaker 13, and an operation switch 14. The voice recognition apparatus 11 and the speaker 13 are connected to the navigation ECU 16 of the navigation apparatus 15 that is mounted in the vehicle. That is, the vehicle voice recognition apparatus 10 according to the present embodiment functions as an input and output apparatus for the navigation apparatus 15.

Moreover, the navigation apparatus 15 comprises a navigation ECU 16, a vehicle position calculating unit 17, a map data storage unit 18, and a display 19.

The voice recognition apparatus 11 carries out voice recognition of the voice input that has been input from the microphone 12. The result of this recognition is output to another control unit of the navigation ECU 15 or the like, and at the same time, each type of response message is output from the speaker 13 during the steps of the recognition processing.

The voice recognition unit 11 comprises, for example, a voice recognition possible/impossible determining unit 21, a response change executing unit 22 that operates when recognition is impossible, a recognition processing unit 23, and a change executing unit 24 that operates during cancellation.

The voice recognition possible/impossible determining unit 21 determines whether or not execution of the voice recognition processing is possible, as will be described below.

The response change executing unit 22 that operates when recognition is impossible outputs from the speaker 13 response messages that differ depending on the number of times it has been determined that recognition is impossible and the factor causing the impossibility determination when it has been determined in the voice recognition possible/impossible determining unit 21 that execution of the voice recognition processing is impossible, as will be described below.

The recognition processing unit 23 carries out voice recognition processing of the voice input from the microphone 12 when it has been determined by the voice recognition possible/impossible determining unit 21 that the execution of the voice recognition processing is possible, and outputs the results of the recognition to another control unit, as will be described below.

The change executing unit 24 that operates during cancellation outputs from the speaker 13 response messages that differ depending on the number of cancellations when canceling the current recognition result and correcting the recognition process again in the case that the recognition result of the recognition processing unit 23 is different from the voice input, as will be described below.

The navigation ECU 16 receives the commands by voice input of the user via the vehicle voice recognition apparatus 10 and executes the route guidance. Commands of the user may include, for example, setting of the destination and the route, or commands related to various operations. The vehicle position calculating unit 17 comprises a position measuring signal receiving unit (not illustrated) that receives a position measuring signal such as a GPS (Global Positioning System) signal for measuring the position of the vehicle using, for example, a satellite, or a D (Differential) GPS signal for improving the position measuring precision by compensating the error in the GPS signal using, for example, a suitable base station.

In addition, the vehicle position calculating unit 17 is connected to a vehicle state detecting unit (not illustrated) comprising a yaw rate sensor formed by a piezoelectric element, gyro sensor, or the like that detects the orientation of the vehicle on a horizontal surface, the amount of the change of the inclination angle of the vehicle with respect to the vertical direction or the like, and a vehicle speed sensor that detects the speed and acceleration of the vehicle.

In addition, the vehicle position calculating unit 17 calculates the current position of the vehicle by an automatic navigation calculating process based on a position measuring signal of a GPS signal, a DGPS signal or the like received by the position measuring signal receiving unit and the detected signal output from the yaw rate sensor, the vehicle speed sensor, or the like.

Furthermore, map matching is carried out based on the current calculated position of the vehicle and the map data stored in advance in the map data storage unit 18.

The display 19 carries out the display of the navigation route and the road and traffic information. In the display of the navigation route, for example, the navigation route between the current position of the vehicle calculated in the vehicle position calculating unit 17 and destination input by the user via the vehicle voice recognition apparatus 10 is displayed on the map data found in the map data storage unit 18.

The vehicle voice recognition apparatus 10 according to the present embodiment comprises the structure described above, and next, the operation of the vehicle voice recognition apparatus 10 will be explained with reference to the attached drawings.

Figure 2:
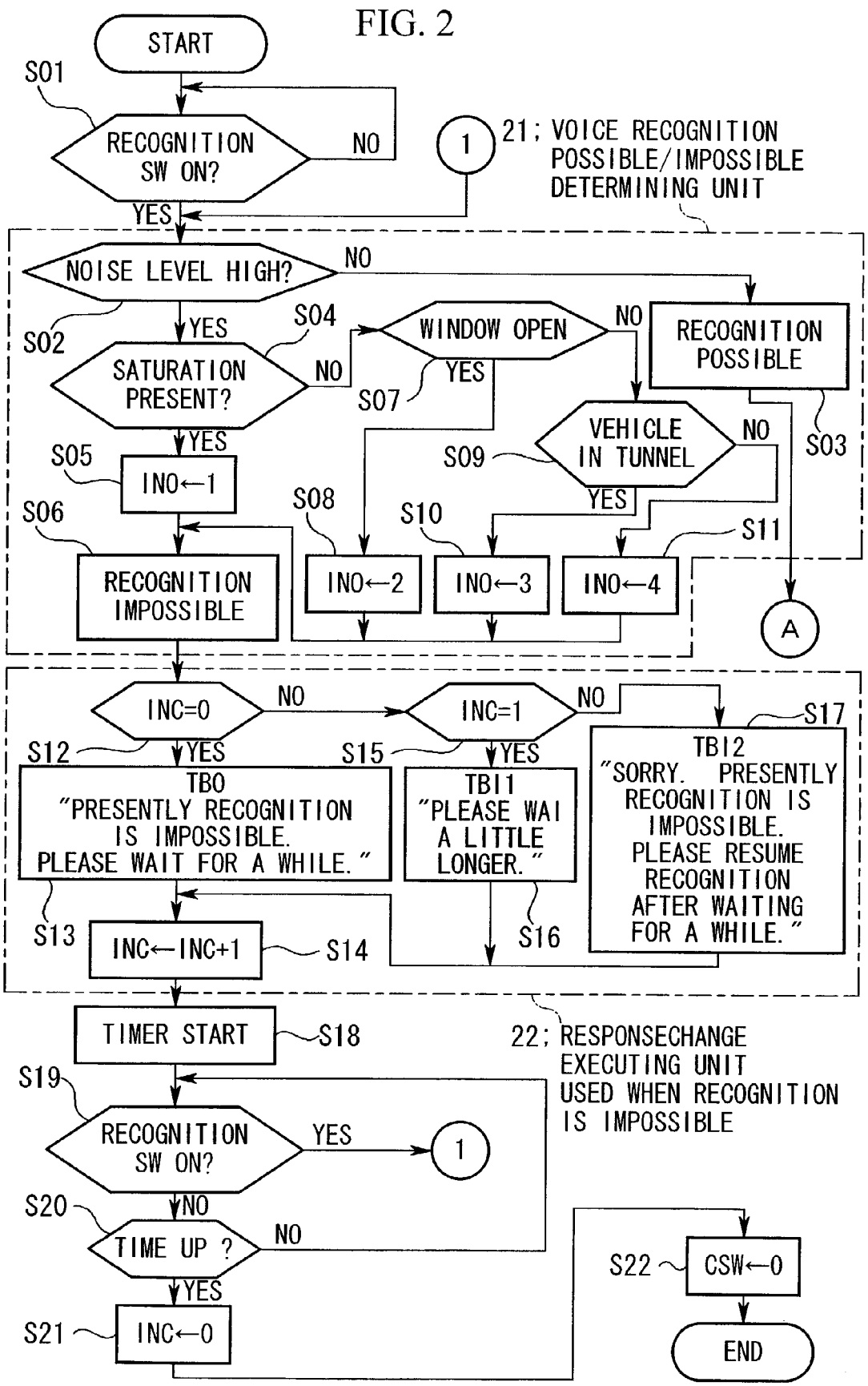
FIG. 2 is a flowchart showing the processing of the operation of the vehicle voice recognition apparatus, and in particular, the voice recognition possibility/impossibility determining unit and the response change executing unit that operates when recognition is impossible.
Figure 3:
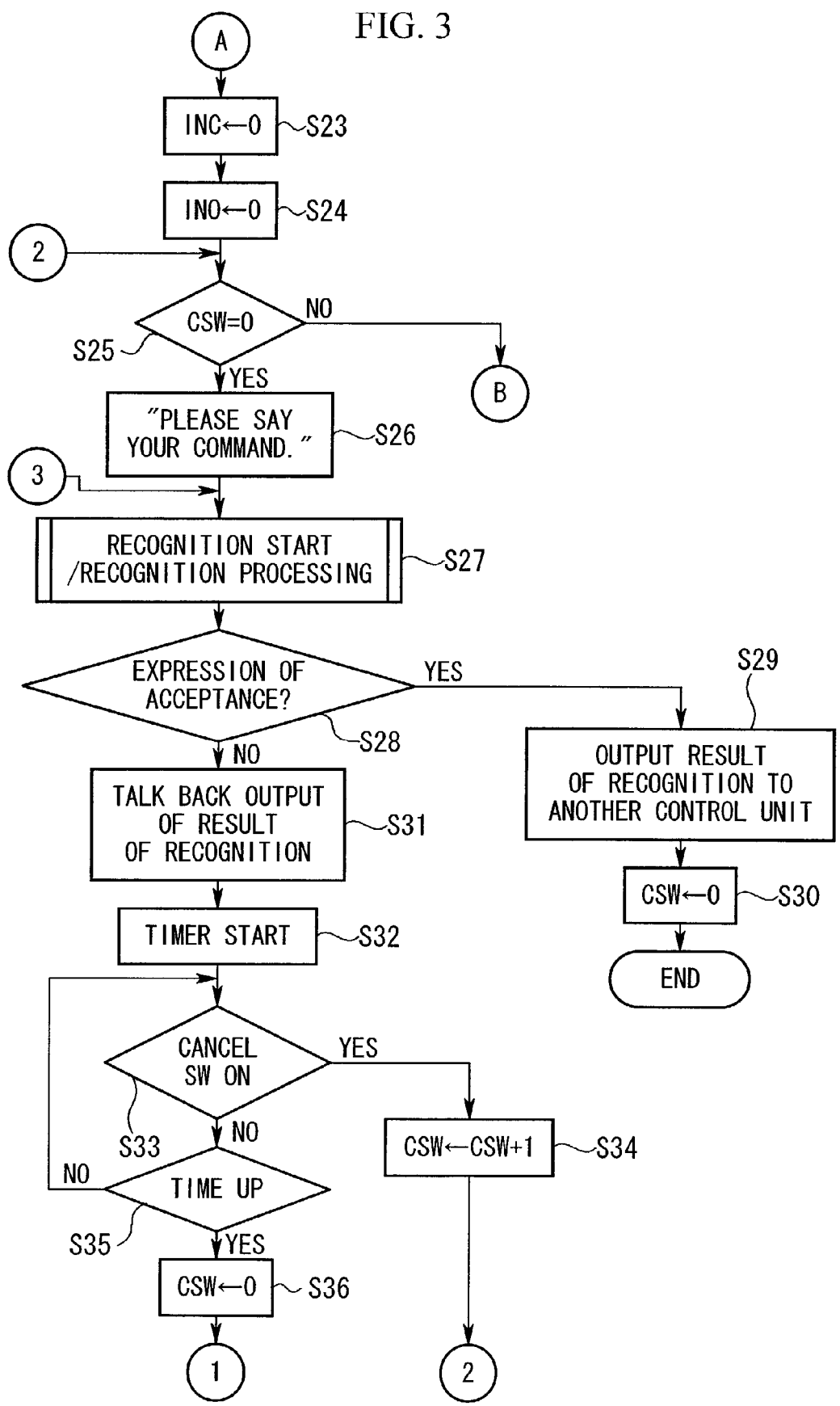
FIG. 3 is a flowchart showing the operation of the vehicle voice recognition apparatus, and in particular the processing of the recognition processing unit.
Figure 4:
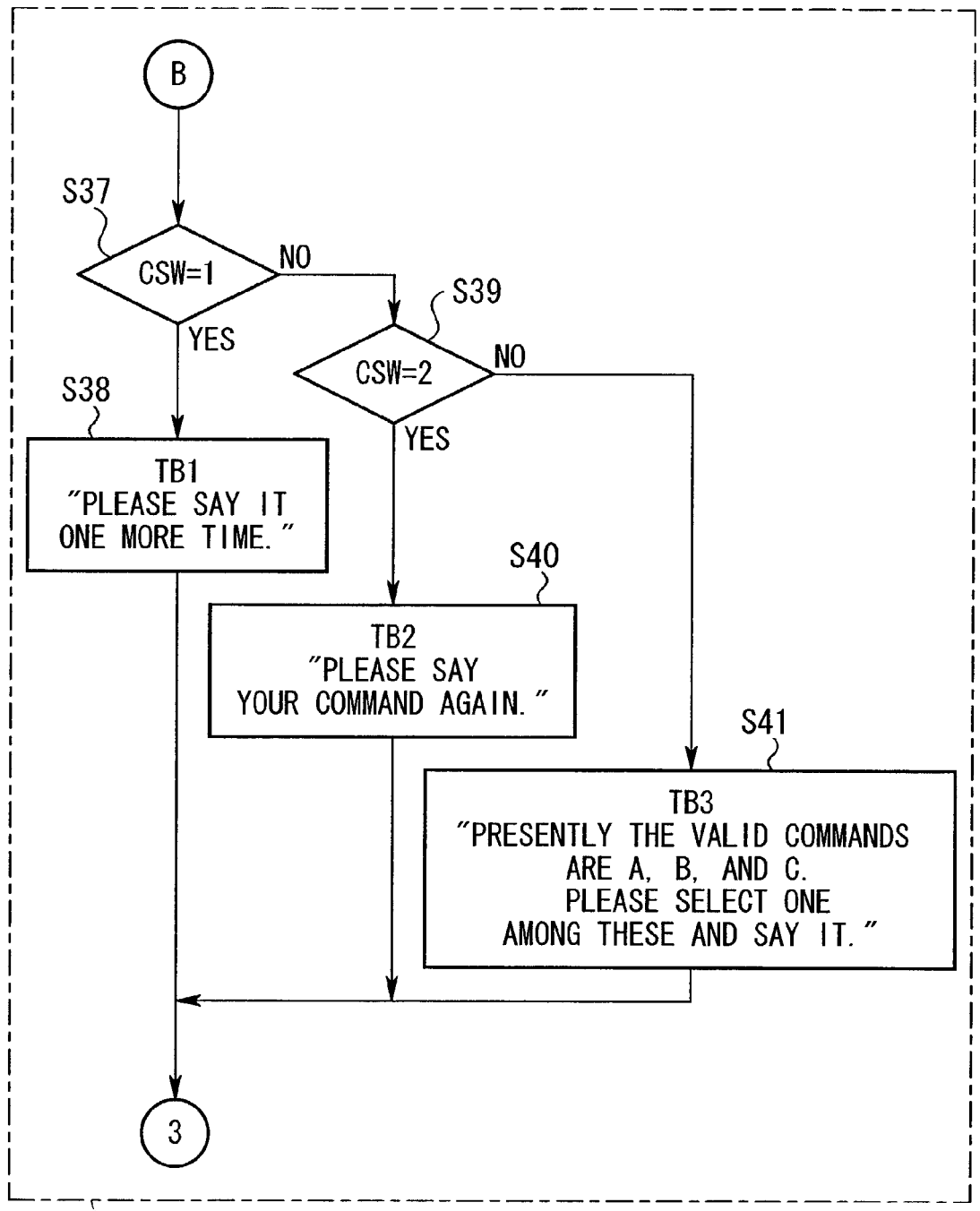
FIG. 4 is a flowchart showing the operation of the vehicle voice recognition apparatus, and in particular the processing of the change executing unit that operates during cancellation.

FIG. 2 is a flowchart showing the operation of the vehicle voice recognition apparatus 10, and in particular the processing of the voice recognition possible/impossible determining unit 21 and the response change executing unit 22 that operates when recognition is impossible; FIG. 3 is a flowchart showing the operation of the vehicle voice recognition apparatus 10, and in particular the processing of the recognition processing unit; and FIG. 4 is a flowchart showing the operation of the vehicle voice recognition apparatus 10, and in particular the processing of the change executing unit 24 that operates during cancellation.

First, in step S 01 shown in FIG. 2, by inputting from the operating switch 14 or the like, it is determined whether or not the recognition switch (recognition SW) that directs the operation of the apparatus is turned ON.

In the case that the result of the determination is NO, the processing of step S 01 is repeated. In the case that the result of the determination is YES, the processing proceeds to step S 02.

In step S 02, it is determined whether the level of the noise in the vicinity detected by the microphone 12 is higher than a predetermined level.

In the case that the result of the determination is NO, the processing proceeds to step S 03, and when it is determined that voice recognition is possible, the processing of the recognition processing unit 23 described below, that is, the processing of step S 23 and after, is carried out.

In contrast, in the case that the result of the determination is YES, the processing proceeds to step S 04.

In step S 04, for example, it is determined whether or not a situation has occurred in which the sensitivity of the microphone 12 has become saturated due to the presence of wind blowing on the microphone 12 or the like.

In the case that the result of the determination is YES, the processing proceeds to step S 05, the factor flag INO indicating the impossibility of recognition is set to '1', and the processing proceeds to step S 06. In step S 06, it is determined that recognition is impossible, and the processing proceeds to step S 12 described below.

In contrast, in the case that the result of the determination is NO, the processing proceeds to step S 07.

In step S 07, it is determined whether or not a window (not illustrated) of the vehicle is open.

In the case that the result of the determination is YES, the processing proceeds to step S 08, the factor flag INO indicating the impossibility of recognition is set to '2', and the processing proceeds to step S 06.

In contrast, in the case that the result of the determination is NO, the processing proceeds to step S 09.

In step S 09, it is determined whether or not the vehicle is positioned inside a tunnel.

In the case that the result of the determination is YES, the processing proceeds to step S 10, the factor flag INO indicating the impossibility of recognition is set to '3', and the processing proceeds to step S 06.

In contrast, in the case that the result of the determination is NO, the processing 20 proceeds to step S 11, the factor flag INO indicating the impossibility of recognition is set to '4', and the processing proceeds to step S 06.

Moreover, the sequence of processing in step S 02 to step S 11 described above forms the voice recognition possibility/impossibility determining unit 21.

In step S 12, it is determined whether or not the recognition impossibility count INC is zero.

In the case that the result of the determination is YES, the processing proceeds to step S 13, and a predetermined voice response, for example, "Presently recognition is impossible. Please wait for a while." is output by referring to a predetermined zeroth response table TBI0. The processing proceeds to step S 14, the value obtained by adding 1 to the recognition impossible count INC is set as the new recognition impossible count INC, and the processing proceeds to step S 18, described below.

In contrast, in the case that the result of the determination is NO, the processing proceeds to step S 15.

In step S 15, it is determined whether or not the recognition impossible count INC is 1.

In the case that the result of the determination is YES, the processing proceeds to step S 16, and a predetermined voice response, for example, "Please wait a little longer." is output by referring to the predetermined first response table TBI1.

In contrast, in the case that the result of the determination is NO, the processing proceeds to step S 17, and a predetermined voice response, for example, "Presently recognition is impossible. Please try again after waiting a while." is output by referring to a predetermined second response table TBI2, and the processing proceeds to step S 14.

Moreover, the sequence of processing in step S 12 to step S 17 described above forms the response change executing unit 22 that operates when recognition is impossible.

In step S 18, the calculation of the timer that acts as a decremental timer or the like starts.

Next, in step S 19, it is determined whether or not the recognition switch is ON.

In the case that the result of the determination is YES, the processing returns to step S 02 described above.

In contrast, in the case that the result of the determination is NO, the processing proceeds to step S 20.

In step S 20, it is determined whether or not the calculation of the decremental timer (for example, 1 second) has completed.

In the case that the result of the determination is NO, the processing returns to step S 19 described above.

In contrast, in the case that the result of the determination is YES, the processing returns to step S 21.

In step S 21, the recognition impossible count INC is set to zero.

In addition, in step S 22, the cancel count CSW used during recognition processing described below is set to zero, and the sequence of processing ends.

Below, the processing of the recognition processing unit 23 will be explained with reference to the attached figures.

In step S 23, shown in FIG. 3, the recognition impossible count INC is set to zero.

Next, in step S 24, the factor flag INO indicating that recognition is impossible is set to zero.

In addition, in step S 25, it is determined whether or not the cancel count CSW used during recognition processing is zero.

In the case that the result of the determination is NO, the processing returns to step S 37 described below.

In contrast, in the case that the result of the determination is YES, the processing proceeds to step S 26.

In step S 26, a predetermined voice command, for example, "Please state your command." is output by referring to the predetermined zeroth command table TB0, and the processing proceeds to step S 27.

In step S 27, the processing for voice recognition starts. That is, the voice input is received from the microphone 2, recognition processing is carried out on this voice input, and the result of the recognition is stored in a suitable unit (not illustrated).

Next, in step S 28, it is determined whether or not the result of the recognition on the input voice is an expression of approval.

In the case that the result of the determination is YES, the processing proceeds to step S 29, the result of the recognition is output to another control unit, and then the processing proceeds to step S 30, the cancel count CSW used during recognition processing is set to zero, and the sequence of processing ends.

In step S 31, the recognition results are output as talk back.

Next, in step S 32, the calculation of the timer that acts, for example, as a decremental timer, starts.

Next, in step S 33, the recognition result output by talk back in step S 31 is input from the operation switch 14 in the case that it differs from the voice input, and it is determined whether or not the cancel switch that commands the cancellation of the recognition result is turned ON.

In the case that the result of the determination is YES, the processing proceeds to step S 34, and the value obtained by incrementing by 1 the cancel count CSW used during recognition processing is set as the new cancel count CSW used during recognition processing, and the processing returns to step S 25 described above.

In contrast, in the case that the result of the determination is NO, the processing proceeds to step S 35.

In step S 35, it is determined whether or not the calculation of the decremental timer (for example, 1 second or the like) has ended.

In the case that the result of the determination is NO, the processing returns to step S 33 described above.

In contrast, in the case that the result of the determination is YES, the processing proceeds to step S 36, the cancel count CSW used during recognition processing is set to zero, and the processing returns to step S 02 described above.

That is, the recognition result of the voice input in step S 27 is output by talk back in step S 31, an expression of approval such as "Yes, that is correct" or "OK" with respect to the talk back output is input by the user, and when the expression of approval is recognized in step S 27, the recognition result that is stored in a suitable storage unit (not illustrated) is output to another control unit.

In addition, in step S 37 shown in FIG. 4, it is determined whether or not the cancel count CSW used during recognition processing is 1.

In the case that the result of the determination is YES, the processing proceeds to step S 38, a predetermined voice command, such as "Please state it again." is output by referring to a predetermined first command table TB1, and the processing returns to step S 27 described above.

In contrast, in the case that the result of the determination is NO, the processing proceeds to step S 39, and it is determined whether or not the cancel count CSW used during recognition processing is 2.

In the case that the result of the determination is YES, the processing proceeds to step S 40, a predetermined voice command, for example, "Please state your command once again." is output by referring to a predetermined second command table TB2, and the processing returns to step S 27 explained above.

In contrast, in the case that the result of the determination is NO, the processing proceeds to step S 41, a predetermined voice command, for example, "Currently valid commands are A, B, and C. Please select one among these." is output by referring to a predetermined third command table TB3, and the processing returns to step S 27 described above.

Moreover, the sequence of processing in step S 37 to step S 41 described above forms the change executing unit 24 that operates during cancellation.

As described above, according to the vehicle voice recognition apparatus 10 of the present embodiment, the content of notifications sent to the user are changed depending on the number of times it has been determined that recognition is impossible by the voice recognition possible/impossible determining unit 21, and for example, by outputting different voice responses in a conversational manner, in comparison to the case of repeating the same response, the feeling of discomfort of the user can be decreased.

In addition, because a determination of the possibility or impossibility of voice recognition is carried out before actually carrying out recognition processing on a voice input, the voice recognition processing is not carried out uselessly in the case that, for example, voice recognition is impossible, and it is possible to prevent unnecessarily increasing the calculation load, and prevent the recognition error rate from increasing.

Furthermore, depending on the number of cancellations of the recognition processing, the operability for the user can be improved by changing the content of the voice commands to a more detailed content.

Moreover, in the present embodiment described above, in the processing of step S 12 to step S 17, which form the response change executing unit 22 that operates when recognition is impossible, depending on the number of times is has been determined that recognition is impossible in the voice recognition possible/impossible determining unit 21, that is, depending on the recognition impossible count INC, the response when recognition is impossible is changed, but the embodiment is not limited thereby. For example, the response can be changed depending on the factors that cause recognition to be impossible, that is, the factor flag INO indicating that recognition is impossible, as is illustrated by the flowchart showing the processing of step S 42 to step S 48, which form the first modification of the response change executing unit 22 of the present embodiment shown in FIG. 5, which operates when recognition is impossible. Moreover, below, parts identical to those in the embodiment described above are denoted by the same reference numerals, and their explanation has been omitted.

Figure 5:
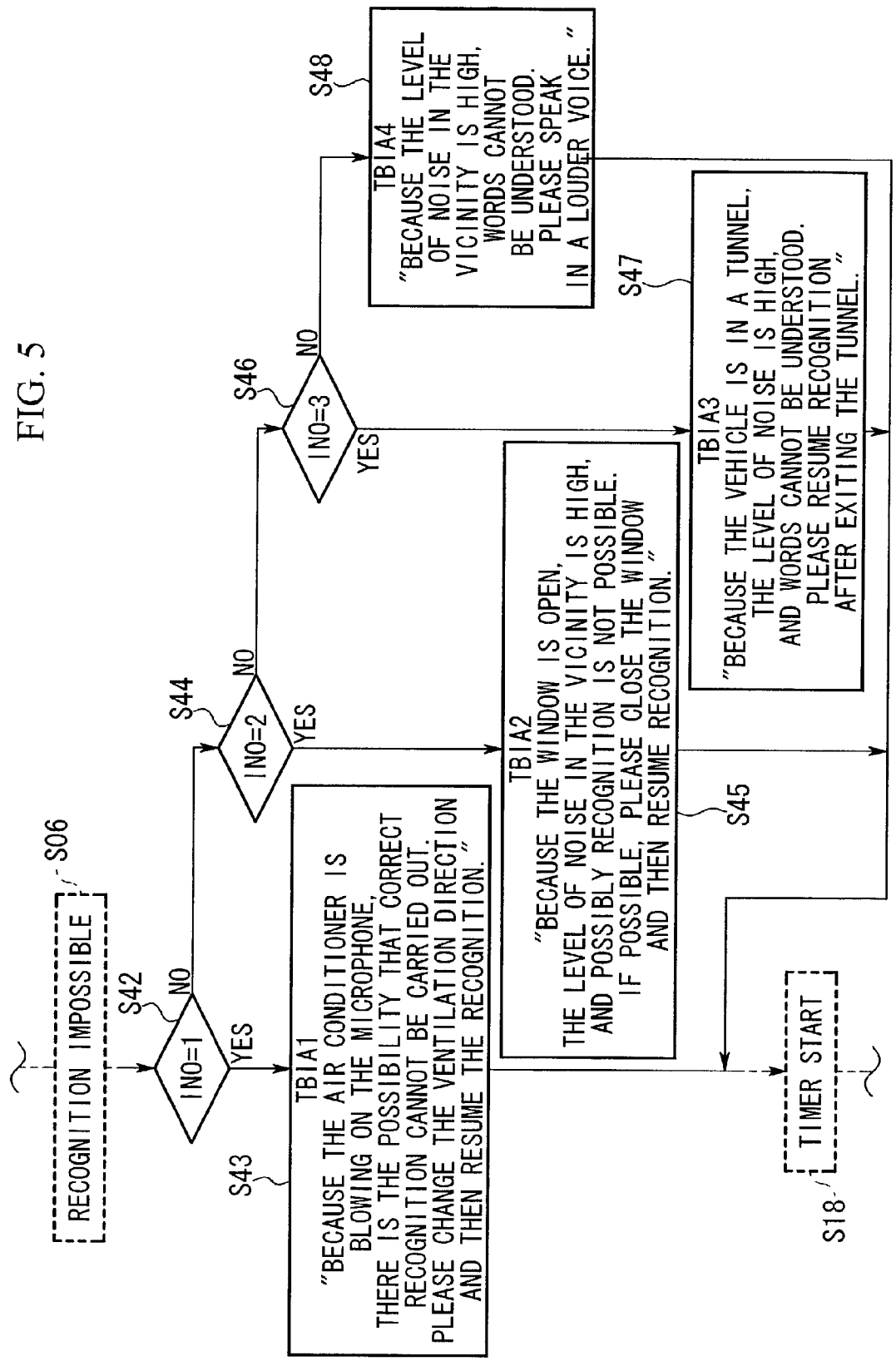
FIG. 5 is a flowchart showing the processing of steps S 42 to S 48, which structures the first modification of the present embodiment of the response change executing unit that operates when recognition is impossible.

Specifically, in the first modification, first in step S 42 shown in FIG. 5, it is determined whether or not the factor flag INO indicating that recognition is impossible is 1.

In the case that the result of the determination is YES, the processing proceeds to step S 43, and a predetermined voice response, for example, "Because the air conditioning is blowing on the microphone, there is a possibility that correct recognition will not occur. Please resume recognition after changing the direction of the air flow." is output by referring to a predetermined first response table TBIa1, and the processing proceeds to step S 18 described above.

In contrast, in the case that the result of the determination is NO, the processing proceeds to step S 44.

In step S 42, it is determined whether or not the factor flag INO indicating the impossibility of recognition is 2.

In the case that the result of the determination is YES, the processing proceeds to step S 45, and a predetermined voice response, for example, "Because the window is open, the level of noise in the vicinity is high, and there is the possibly that recognition is not possible. If possible please resume recognition after closing the window." is output by referring to a predetermined response table TBIa2, and the processing proceeds to step S 18.

In contrast, in the case that the result of the determination is NO, the processing proceeds to step S 46, and it is determined whether or not the factor flag INO indicating the impossibility of recognition is 3.

In the case that the result of the determination in step S 46 is YES, the processing proceeds to step S 47, and a predetermined voice response, for example, "The noise level is high because the vehicle is in a tunnel, and thus words cannot be understood. Please resume recognition after exiting the tunnel." is output by referring to a predetermined third response table TBIa3, and the processing proceeds to step S 18.

In contrast, in the case that the result of the determination in step S 46 is NO, the processing proceeds to step S 48, a predetermined voice response, for example, "The noise level in the vicinity is high, and thus words cannot be understood. Please speak with a louder voice." is output by referring to a fourth predetermined response table TBIa4, and the processing proceeds to step S 18.

In this case, when it is determined that voice recognition is impossible before the processing of the voice recognition starts, specific instructions can be given to the user in order to make voice recognition possible, and thereby the operability of the vehicle voice recognition apparatus can be improved, and the apparatus can be made to function effectively.

Figure 6:
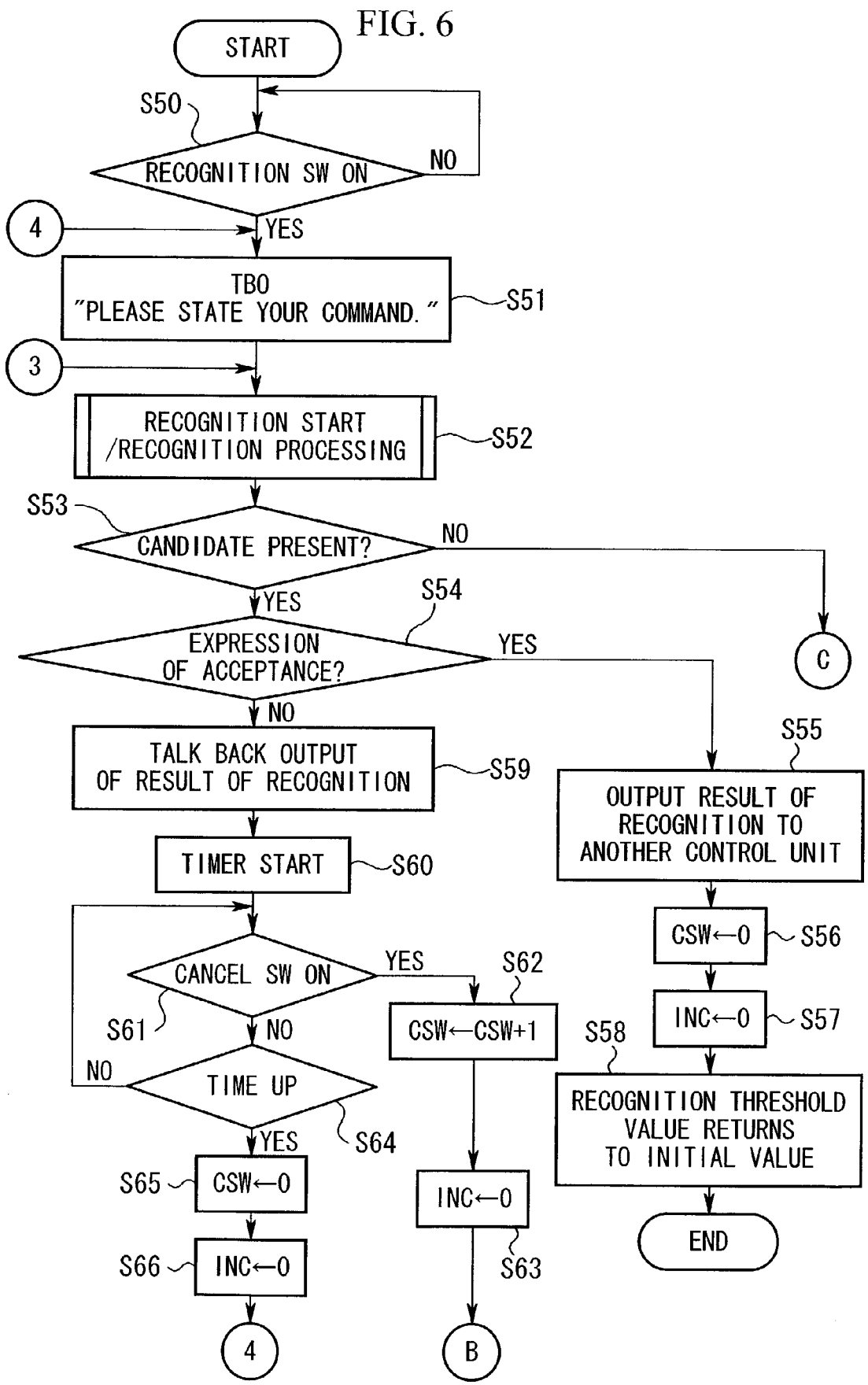
FIG. 6 is a flowchart showing the operation according to a second modification of the present embodiment of the vehicle voice recognition apparatus.
Figure 7:
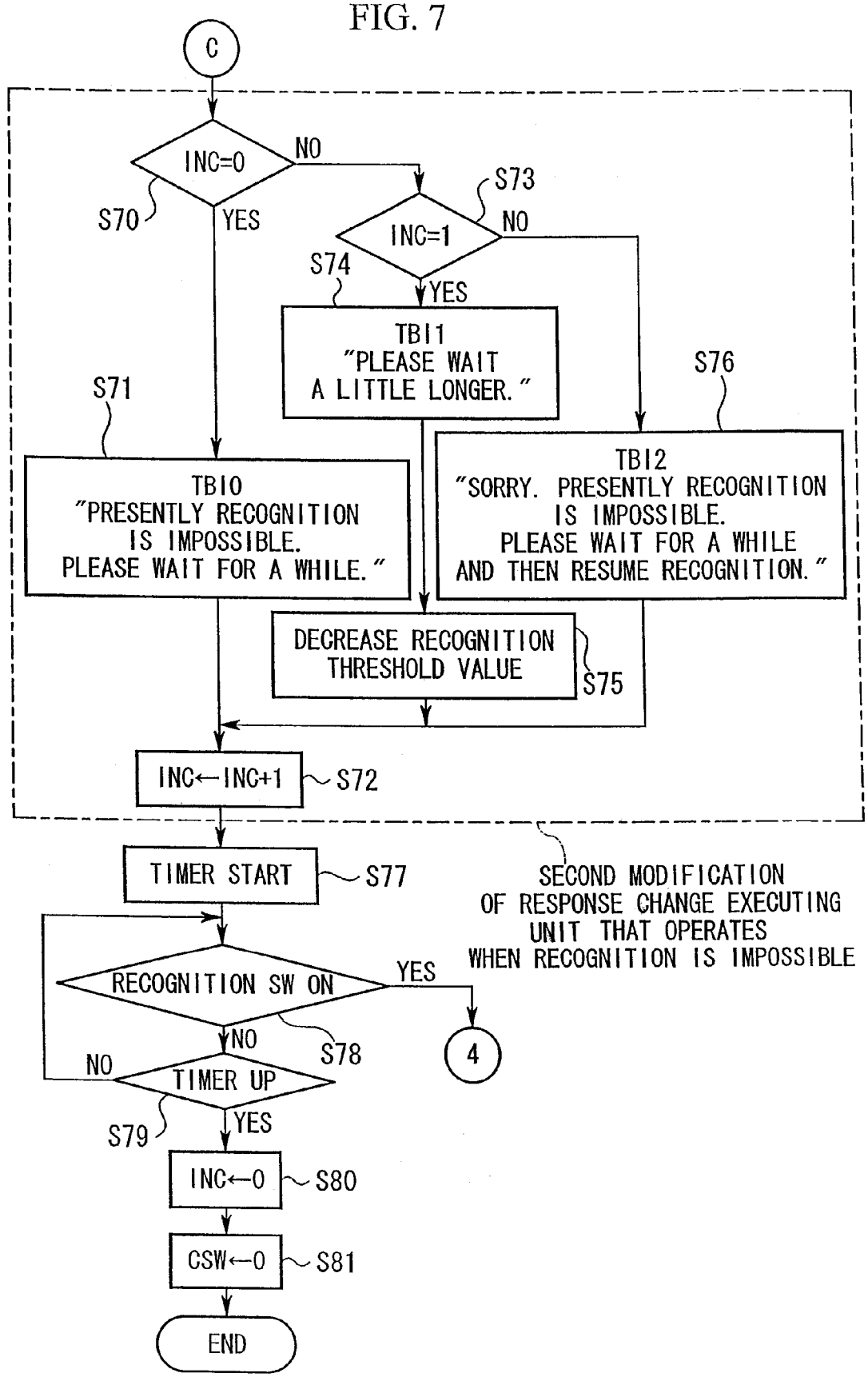
FIG. 7 is a flowchart showing the operation according to the second modification of the present embodiment of the vehicle voice recognition apparatus.

Moreover, in the embodiment described above, the voice recognition possible/impossible determining unit 21 is formed by step S 02 to step S 11, and the recognition processing unit 23 is formed by step S 23 to step S 36 and step S 37 to step S 41, but this is not limiting. For example, the processing in the voice recognition possible/impossible determining unit 21 and the processing in the recognition processing unit 23 can be unified, as illustrated in the flowcharts in FIG. 6 and FIG. 7 showing the operation according to a second modification of the vehicle voice recognition apparatus 10 of the present embodiment. Moreover, in the following, parts that are identical to those of the embodiment described above are denoted by identical reference numbers, and their explanation is omitted.

Specifically, in the second modification, first in step S 50 shown in FIG. 6, it is determined whether or not the recognition switch (recognition SW) is turned ON.

In the case that the result of the determination is NO, the processing repeats step S 50. In contrast, in the case that the result of the determination is YES, the processing proceeds to step S 51.

In step S 51, a predetermined voice command, for example "Please state your command." is output by referring to a predetermined zeroth command table TB0, and the processing proceeds to step S 52.

In step S 52, the processing of the voice recognition starts.

Next, in step S 53, when voice recognition is carried out by selecting from among preset predetermined reference data a candidate word or speech pattern having the most likelihood depending on a predetermined recognition threshold value, it is determined whether or not there is a selected candidate.

In the case that the result of the determination is YES, the processing proceeds to step S 54. In contrast, in the case that the result of the determination is NO, it is determined that recognition is impossible, and the processing according to the second modification of the response change executing unit 22 of the embodiment described below, which operates when recognition is impossible, that is, the processing of step S 70 and after, is carried out.

In step S 54, it is determined whether or not the recognition result for the input voice comprises the expression of approval.

In the case that the result of the determination is YES, the processing proceeds to step S 55, the recognition result is output to another control unit, and then the cancel count CSW used during recognition processing is set to zero (step S 56), the recognition impossible count INC is set to zero (step S 57), and the recognition threshold value described below returns to a predetermined initial value (step S 58), and the sequence of processing ends.

In contrast, in the case that the result of the determination is NO, the processing proceeds to step S 59.

In step S 59, the recognition result is output as talk back.

Next, in step S 60, for example, the calculation of a timer that acts, for example, as a decremental timer, is started.

Next, in step S 61, it is determined whether or not the cancel switch (cancel SW) input from the operation switch 14 or the like is turned ON.

In the case that the result of the determination is YES, the processing proceeds to step S 62, the value obtained by adding 1 to the cancel count CSW used during recognition processing is set as the new cancel count CSW used during recognition processing. Then the recognition impossible count INC is set to zero (step S 63), the processing of the change executing unit 24 that operates during cancellation described above, that is, steps S 35 to step S 39, is carried out, and the processing returns to step S 52.

In contrast, in the case that the result of the determination is NO, the processing proceeds to step S 64.

In step S 64, it is determined whether or not the calculation of the decremental timer (for example 1 second) has completed.

In the case that the result of the determination is NO, the processing proceeds to step S 61 described above.

In contrast, in the case that the result of the determination is YES, the cancel count CSW that operates during cancellation is set to zero (step S 65), the recognition impossible count INC is set to zero (step S 66), and the processing returns to step S 51 described above.

Below, the processing according to the second modification of the response change executing unit 22 of the present embodiment, which operates when recognition is impossible, that is, steps S 70 and after, will be explained.

First, in step S 70 shown in FIG. 7, it is determined whether or not the recognition impossible count INC is zero.

In the case that the result of the determination is YES, the processing proceeds to step S 17, and a predetermined voice response, for example, "Presently recognition is not possible. Please wait for a while." is output by referring to a predetermined zeroth response table TBI0, and the processing proceeds to step S 72. The value obtained by adding 1 to the recognition impossible count INC is set as the new recognition impossible count INC, and the processing proceeds to step S 77 described below.

In contrast, in the case that the result of the determination is NO, the processing proceeds to step S 73.

In step S 73, it is determined whether or not the recognition impossible count INC is 1.

In the case that the result of the determination is YES, the processing proceeds to step S 74, a predetermined voice response, for example, "Please wait for a while." is output by referring to a predetermined first response table TBI1, the processing proceeds to step S 75, the threshold value is decreased by a predetermined value, and the processing proceeds to step S 72.

In contrast, in the case that the result of the determination is NO, the processing proceeds to step S 76, a predetermined voice response, for example, "Presently recognition is impossible, "Please resume recognition after waiting for a while." is output by referring to a predetermined second response table TBI2, and the processing proceeds to step 72.

Moreover, the sequence of processing in step S 70 to step S 76 described above forms the second modification of the response change executing unit 22 of the present embodiment, which operates when recognition is impossible.

In step S 77, the calculation of a timer that acts as a decremental timer or the like starts.

Next, in step S 78, it is determined whether or not the recognition switch is turned ON.

In the case that the result of the determination is YES, the processing proceeds to step S 51 described above.

In contrast, in the case that the result of the determination is NO, the processing proceeds to step S 79.

In step S 79, it is determined whether or not the calculation of the decremental timer (for example, 1 second) has completed.

In the case that the result of the determination is NO, the processing returns to step S 78 described above.

In contrast, in the case that the result of the determination is YES, the processing proceeds to step S 80.

In step S 80, the recognition impossible count INC is set to zero.

In addition, in step S 81, the cancel count CSW used during recognition processing is set to zero, and this sequence of processing ends.

In this case, depending on the number of times it has been determined that recognition is impossible, the content of the notification sent to the user is modified, and for example, by outputting differing in voice responses in a conversational style, in comparison to repeating the same response, the feeling of discomfort of the user can be decreased.

Furthermore, in the case that it is determined that recognition is impossible without the presence of a selected candidate for the recognition result of the voice input, the content of the response is altered based on a decreasing recognition threshold value depending on the number of times recognition is impossible, and at the same time, by altering the processing content of the recognition processing, there is a possibility of finding a corresponding candidate, and the feeling of discomfort can be even further decreased.

Moreover, in the second modification of the present embodiment described above, in the processing of step S 70 to step S 76 that form the second modification of the response change executing unit 22 that operates when recognition is impossible, depending on the number of times it has been determined that recognition is impossible, that is, depending on the recognition impossible count INC, the response when recognition is impossible is changed, but it is not limited thereby. For example, like the processing of step S 90 to step S 98 that form the third modification of the response change executing unit 22 of the present invention shown in FIG. 8, which operates when recognition is impossible, the response can be changed depending on the factor that causes recognition to be impossible. Moreover, below, parts identical to those of the embodiment have identical reference numerals, and their explanation is omitted.

Figure 8:
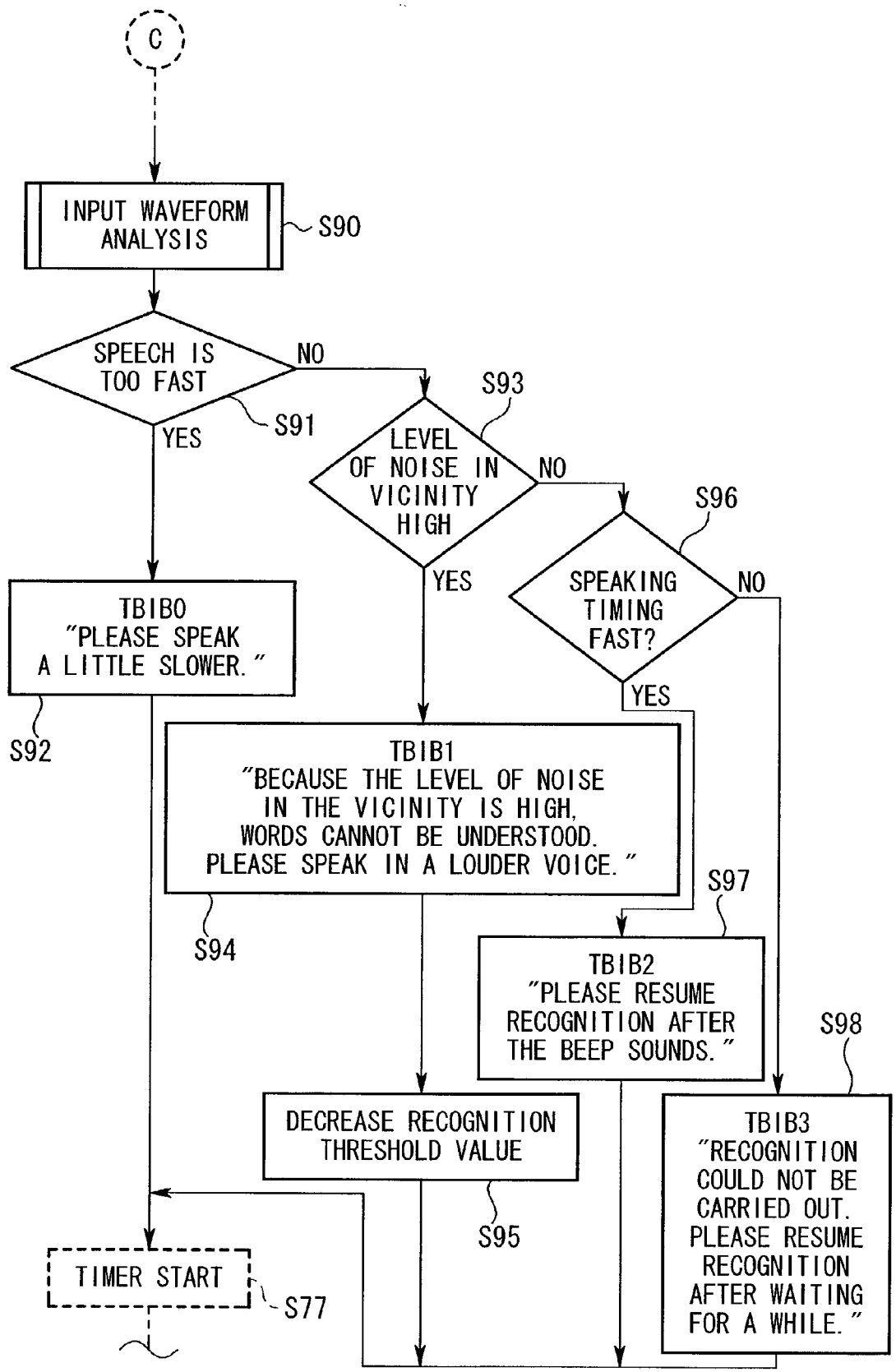
FIG. 8 is a flowchart showing the processing of step S90 to step S 98, which forms a third modification of the present embodiment of the response change executing unit that operates when recognition is impossible.

Specifically, in the third modification, first, in step S 90 shown in FIG. 8, an input waveform analysis of the voice input is carried out.

In addition, in step S 91, it is determined whether or not the results of the analysis of the input waveform is covered by the zeroth factor (for example, the speaking during voice input was too fast or the like).

In the case that the result of the determination is YES, the processing proceeds to step S 92, and a predetermined voice response, for example, "Please speak a little more slowly." is output by referring to a predetermined zeroth response table TBIb0, and the processing proceeds to step S 77 described above.

In contrast, in the case that the result of the determination is NO, the processing proceeds to step S 93.

In step S 93, it is determined whether or not the results of the analysis of the input waveform is covered by the first factor (for example, the level of noise in the vicinity is too high or the like).

In the case that the result of the determination is YES, the processing proceeds to step S 94, a predetermined voice response, for example, "Your words cannot be understood because the level of noise in the vicinity is too high. Please speak in a louder voice." is output by referring to a predetermined first response table TBIb1, the processing proceeds to step S 95, the recognition threshold value is decremented by a predetermined value, and the processing proceeds to step S 77.

In contrast, in the case that the result of the determination is NO, the processing proceeds to step S 96, and it is determined whether or not the result of the analysis of the input waveform is covered by the second factor (for example, the generation timing is fast or the like).

If the result of the determination is YES, the processing proceeds to step S 97, a predetermined voice response, for example, "Please speak again after the beep sounds." is output by referring to a predetermined second response table TBIa2, and the processing proceeds to step S 77.

In contrast, in the case that the result of the determination is NO, the processing proceeds to step S 98, a predetermined voice response, for example "Recognition is impossible. Please resume recognition again after waiting for a while." is output by referring to a predetermined third response table TBIb3, and the processing proceeds to step S 77.

In this case, when it is determined that voice recognition is impossible before the processing of the voice recognition is started, specific instructions can be given to the user to make the voice recognition possible, and the operability of the vehicle voice recognition apparatus 10 can be improved.

As explained above, according to a first aspect of the vehicle voice recognition apparatus of the present invention, even in the case that, for example, it is repeatedly determined that voice recognition is impossible, at this time, a response having a differing expression is output, and thus in comparison to repeatedly outputting the same message, the feeling of discomfort of the operator is decreased.

In addition, according to a second aspect of the vehicle voice recognition apparatus of the present invention, even in the case that, for example, it is repeatedly determined that voice recognition is impossible, at this time, a response having a different expression is output, and thus in comparison to repeatedly outputting the same message, the feeling of discomfort of the operator is decreased.

Furthermore, because the user is specifically notified about the factor that causes the recognition to be impossible, it is possible to carry out a suitable action for making recognition possible depending on the content of the response of the operator.

Furthermore, according to a third aspect of the vehicle voice recognition apparatus of the present invention, even in the case that it is determined that recognition is impossible and an candidate corresponding to the data of the voice input is not found, there is the possibility that a corresponding candidate can be found by changing the recognition threshold value, and the feeling of discomfort of the user can be even further reduced, and the apparatus can function effectively.

Furthermore, according to a fourth aspect of the vehicle voice recognition apparatus of the present invention, even in the case that, for example, recognition errors of the voice input are repeated, at this time, a response having a different expression is output, and thus in comparison to repeatedly outputting the same message, the feeling of discomfort of the operator is decreased.

What is claimed is:

1. A voice recognition apparatus for a vehicle that recognizes a voice input from a user via a voice input device, comprising:
   a response output device for outputting a response to said voice input;
   a recognition possible/impossible determining device for determining whether said voice input can be recognized;
   a response change executing device that is operable, when recognition is determined to be impossible, to output a response having a different expression from said response output device depending on a number of times it has been determined that recognition would be impossible by said recognition possible/impossible determining device;
   a voice recognition device for carrying out recognition of said input voice through said voice input device depending on a predetermined recognition threshold value, said predetermined recognition threshold value being used by said voice recognition device during recognition of said input voice to select a candidate corresponding to said input voice; and,
   a recognition threshold value updating device for updating, when the recognition is determined to be impossible by said recognition possible/impossible determining device, said recognition threshold value to be referred to by said voice recognition device to a lower threshold value, by subtracting a predetermined value, and thereby increasing a possibility of determining the corresponding candidate upon subsequent receipt of the voice input to said voice recognition device.

2. The voice recognition apparatus for a vehicle according to claims 1, further comprising:
a recognition result output device for outputting a recognition result of said voice input;
a recognition result cancellation device for canceling said recognition result based on the recognition result output by said recognition result output device; and
a response change executing device that is operable, when said recognition result is cancelled by said recognition result cancellation device, to output a response having a different expression from said response output device depending on a number of times said recognition result is cancelled or a factor of the cancellation of said recognition result.

3. A voice recognition apparatus for a vehicle that recognizes voice input from a user via a voice input device comprising:
a response output device for outputting a response to said voice input;
a recognition possible/impossible determining device for determining whether said voice input can be recognized;
a factor detecting device for detecting a factor in the determination of recognition impossibility based on a state of the said voice input device or a state of the vehicle, when recognition is determined to be impossible by said recognition possible/impossible determining device; and
a response change executing device that is operable, when recognition is determined to be impossible, to output a response having a different expression from said response output device depending on said factor detected by said factor detecting device.

4. The voice recognition apparatus for a vehicle according to claim 3, further comprising:
a voice recognition device for carrying out recognition of said voice input through said voice input device depending on a predetermined recognition threshold value, said predetermined recognition threshold value being used by said voice recognition device during recognition of said input voice to select a candidate corresponding to said input voice; and
a recognition threshold value update device for updating, when the recognition is determined to be impossible by said recognition possible/impossible determining device, said recognition threshold value, which will be referred to by said voice recognition device, to a lower threshold value by subtracting a predetermined value, and thereby increasing a possibility of determining the corresponding candidate upon subsequent receipt of the voice input to said voice recognition device.

5. The voice recognition apparatus for a vehicle according to claim 3, further comprising:
a recognition result output device for outputting a recognition result of said voice input;
a recognition result cancellation device for canceling said recognition result based on the recognition result output by said recognition result output device; and
a response change executing device that is operable, when said recognition result is cancelled by said recognition result cancellation device, to output a response having a different expression from said response output device depending on a number of times said recognition result is cancelled or a factor of the cancellation of said recognition result.

6. The voice recognition apparatus according to claim 5, wherein said possible/impossible determining device is operable to determine whether it would be possible to recognize said voice input prior to the voice input device receiving the voice input from the user.

7. The vehicle voice recognition apparatus according to claim 3, wherein said factors include window condition and air conditioner operational status.

8. The vehicle voice recognition apparatus according to claim 7, wherein said factors further include ambient noise, and whether said vehicle is located inside of a tunnel.

9. The voice recognition apparatus according to claim 8, wherein said possible/impossible determining device is operable to determine whether it would be possible to recognize said voice input prior to the voice input device receiving the voice input from the user.

10. The voice recognition apparatus according to claim 7, wherein said possible/impossible determining device is operable to determine whether it would be possible to recognize said voice input prior to the voice input device receiving the voice input from the user.

11. The vehicle voice recognition apparatus according to claim 3, wherein the response change executing device is operable, when recognition is determined to be impossible, to prevent functioning of the voice recognition apparatus for a set Urns period and before permitting the user to re-attempt voice recognition.

12. The voice recognition apparatus according to claim 11, wherein said possible/impossible determining device is operable to determine whether it would be possible to recognize said voice input prior to the voice input device receiving the voice input from the user.

13. The voice recognition apparatus according to claim 3, wherein said possible/impossible determining device is operable to determine whether it would be possible to recognize said voice input prior to the voice input device receiving the voice input from the user.

14. A voice recognition apparatus for a vehicle that recognizes voice input from a user via a voice input device comprising:
a response output device for outputting a response to said voice input;
a recognition possible/impossible determining device for determining whether said voice input can be recognized;
a response change executing device that is operable, when recognition is impossible, to output a response having a different expression from said response output device depending on a number of times said recognition possible/impossible determining device has determined that recognition is impossible, and wherein said response change executing device also provides expressions to the user of possible environmental conditions inside and around the vehicle causing said recognition possible/impossible determining device to determine that recognition of said voice input device is impossible.

15. The voice recognition apparatus according to claim 14, wherein said possible/impossible determining device is operable to determine whether it would be possible to recognize said voice input prior to the voice input device receiving the voice input from the user.

* * * * *

UNITED STATES PATENT AND TRADEMARK OFFICE
CERTIFICATE OF CORRECTION

PATENT NO. : 7,212,966 B2 Page 1 of 1
APPLICATION NO. : 10/193521
DATED : May 1, 2007
INVENTOR(S) : Kyomitsu It is certified that error appears in the above-identified patent and that said Letters Patent is hereby corrected as shown below:

Column 16, Line 27, (Claim 11, Line 5), delete "Urns" and insert --time--.

Signed and Sealed this

Fifth Day of June, 2007

JON W. DUDAS
*Director of the United States Patent and Trademark Office*